United States Patent [19]

Thomas, Jr.

[11] 4,260,952
[45] Apr. 7, 1981

[54] CIRCUIT FOR DECODING A DIPHASE SIGNAL

[75] Inventor: James W. Thomas, Jr., Valparaiso, Ind.

[73] Assignee: Teletype Corporation, Skokie, Ill.

[21] Appl. No.: 58,240

[22] Filed: Jul. 17, 1979

[51] Int. Cl.³ .............................................. H03K 9/00
[52] U.S. Cl. .................................... 329/104; 360/43; 375/84
[58] Field of Search ..................... 329/104; 360/41, 43, 360/44; 375/84, 87

[56] References Cited

U.S. PATENT DOCUMENTS

| | | | |
|---|---|---|---|
| 3,737,895 | 6/1973 | Cupp et al. | 329/104 X |
| 3,859,631 | 1/1975 | Holmes | 375/87 |
| 3,982,195 | 9/1976 | Turner | 329/104 X |
| 4,032,915 | 6/1977 | Shanks et al. | 360/44 X |
| 4,139,870 | 2/1979 | Tachi | 360/43 |
| 4,167,760 | 9/1979 | Decker | 360/43 X |
| 4,184,179 | 1/1980 | Deming | 360/43 X |

Primary Examiner—Robert Segal
Assistant Examiner—Edward P. Westin
Attorney, Agent, or Firm—J. C. Albrecht; W. K. Serp

[57] ABSTRACT

Incoming diphase signals E which have base bit intervals delineated by spaced clocking signals with data information occurring between the clocking signals are fed to a four bit shift register 10 which in cooperation with an exclusive OR-gate 14 generates a pulse D for each diphase signal E transition. Upon receipt of a preamble comprising four diphase signal transitions, a shift register 16 provides a signal MSR which initiates the decoding of the following data information. A counter 24 stores counts related to the time intervals between each two successive clocking signals and counters 26 and 28 store a count related to an immediately subsequent time period which is three-fourths of the time interval. The occurrence of data information is sensed by a logic array 20 during successive time periods and a non-return to zero mark-space output signal K is stored in a flip-flop 22. The logic array 20 continually updates the counts stored by the counters 24, 26-28.

2 Claims, 3 Drawing Figures

CIRCUIT FOR DECODING A DIPHASE SIGNAL

DESCRIPTION

1. Technical Field

This invention relates to a circuit for decoding a diphase signal having a varying clock frequency.

2. Background Art

Diphase signal recording is a frequency modulated recording technique wherein each data base bit interval includes a clock signal transition as well as data information. The clock and data information are sequentially recorded. If the information in a base bit interval is to be interpreted as a space, a signal transition occurs between successive clock transitions and correspondingly, if the information in a base bit interval is to be interpreted as a mark, no transition occurs between successive clock transitions. For a more detailed discussion of diphase signal encoding, the reader is directed to U.S. Pat. No. 3,737,895 issued June 5, 1973 by Capp etal and entitled "Di-Phase Data Recorder" and U.S. Pat. No. 3,982,195 issued Sept. 21, 1978 by Turner et.al. and entitled "Method and Apparatus for Decoding Diphase Signals."

Diphase signals are frequently recorded upon a magnetic media such as a magnetizable tape or disc in the form of magnetic flux level transitions. That is, each clock transition defining a base bit interval is recorded as a magnetic level transition as is each space transition. A particular media which is finding increased acceptance is the plastic identification card which has a magnetizable stripe carried thereon encoded with a diphase signal in the form of magnetic level transitions. The user manually positions and pushes the card into a card reader. As the card enters the reader, the magnetic stripe is drawn across a reading head which detects the magnetic flux transitions recorded on the magnetic stripe. It has been found that the speed at which the card is drawn across the magnetic head varies greatly not only during a single insertion but from user to user. In fact, card speed ranges of from two or forty inches per second have been observed. Such a high variation in card speed results in a corresponding signal frequency range of between 150 and 3,000 bits per second. Prior card readers have utilized analogue circuitry which has a limited speed range and noise rejection with such circuits is low. Analogue circuits are relatively expensive as compared with digital techniques and cannot be easily placed on a single integrated circuit and generally require a large number of costly discrete components. The hereinafter described circuit accommodates a wide range of input frequencies, for example, from 150 to 3,000 bits per second easily within the range experienced with the average user.

STATEMENT OF INVENTION

In accordance with this invention, a circuit for decoding diphase signals records the time intervals between successive diphase clocking signals and establishes corresponding time periods which are each shorter than the immediately preceding time interval. The circuit includes means for sensing the data information during the time periods and for generating mark-space signals corresponding thereto.

THE DRAWINGS

DETAILED DESCRIPTION

Input Decoding

Figure 1:
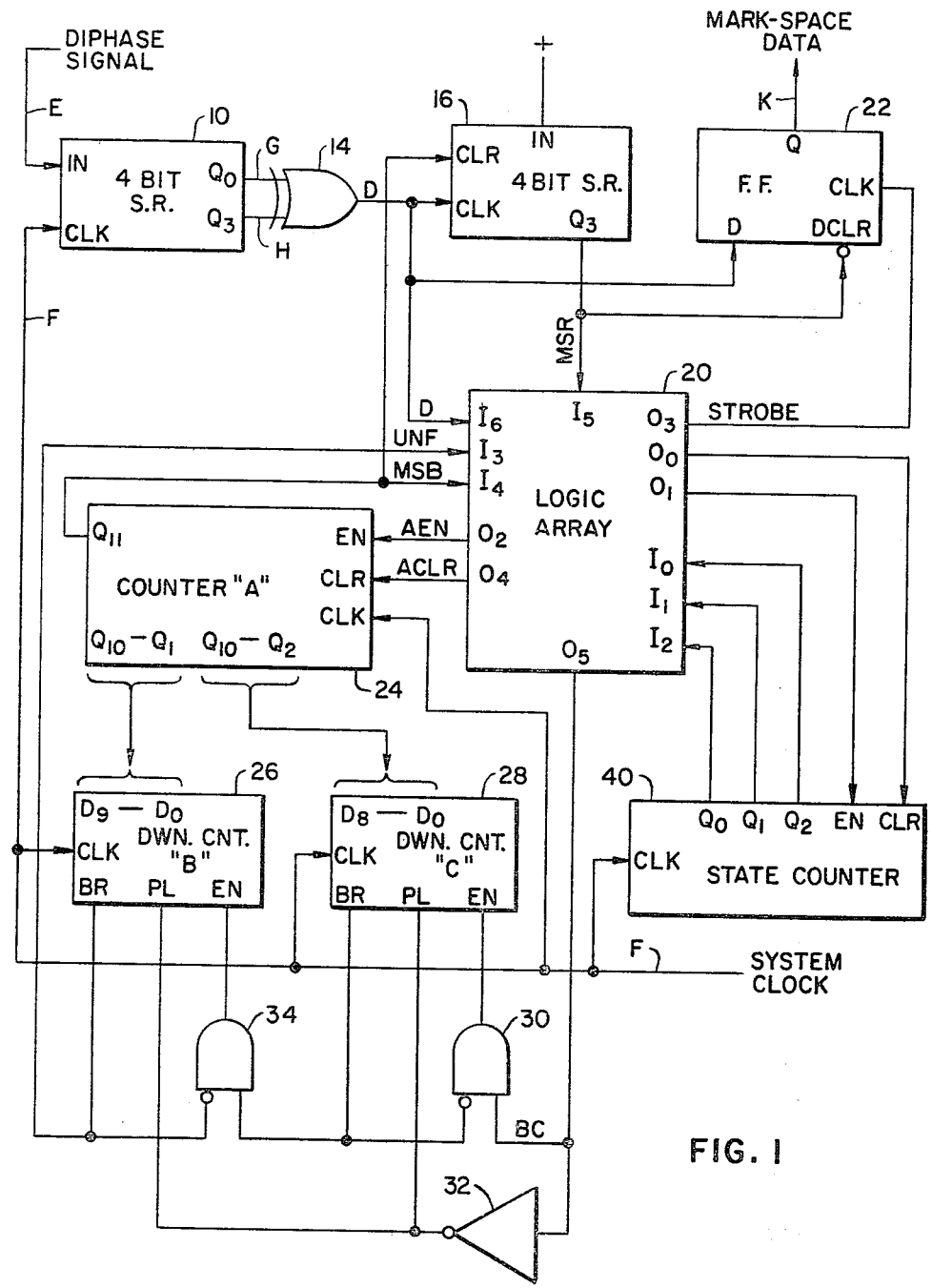
FIG. 1 is a schematic diagram of a circuit for interpreting diphase signals.
Figure 2:
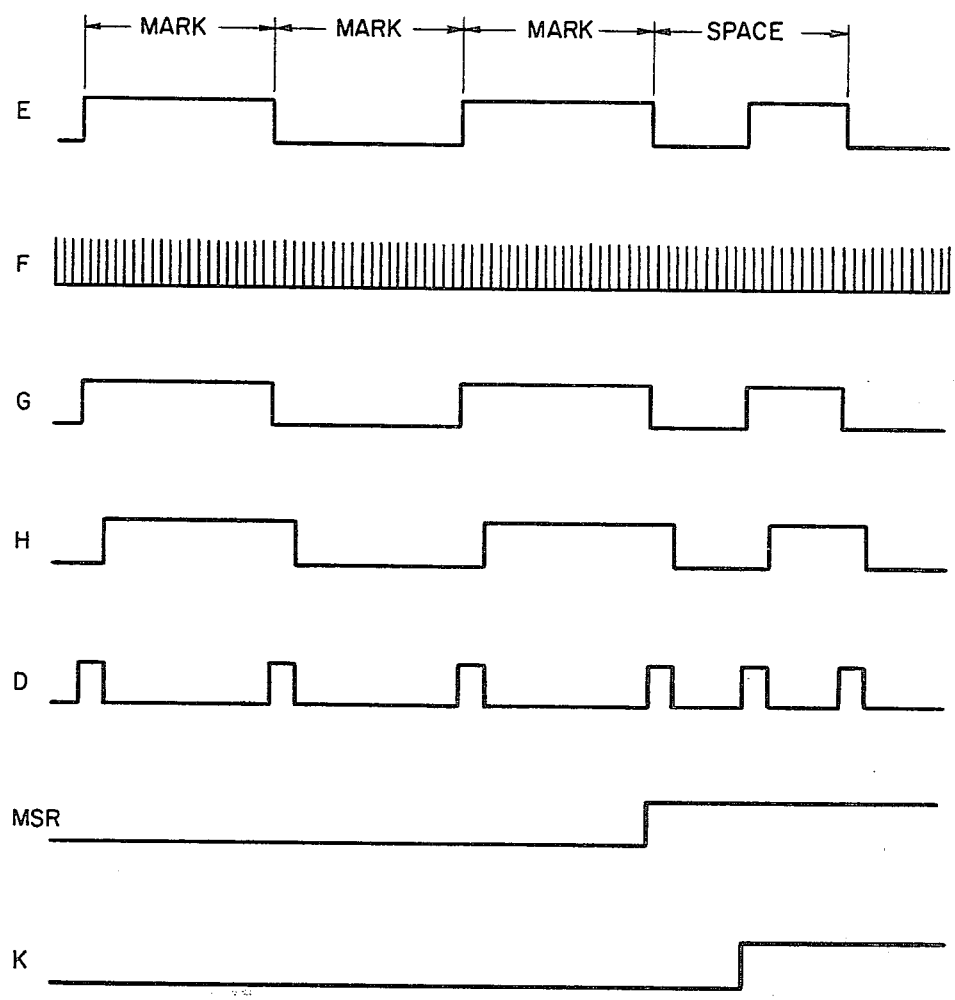
FIG. 2 is a timing diagram of selected signal levels of the circuit of FIG. 1.

The circuit arrangement of FIG. 1 is utilized to interpret diphase signals recorded on a magnetic stripe and to generate corresponding output signals in a binary non-return to zero or mark-space code. A diphase signal E (FIG. 2) is fed to the input terminal of a four-bit shift register 10. The incoming diphase signal E includes clock transitions at the beginning and end of each base-bit interval. For each base bit interval representing a space signal, an additional transition occurs between the successive clocking transitions. Correspondingly, a mark bit does not have a mid-bit interval transition. As illustrated in FIG. 1, the diphase signal is clocked into the shift register 10 by a system clock signal designated as signal F (FIG. 2) which occurs at a rate substantially in excess of the clock rate of the diphase signal E, e.g., twenty times the nominal clock rate of the incoming diphase signal E. The $Q_0$ and $Q_3$ output signals of the first and fourth stages of the shift register 10, are respectively designated signals G and H (FIG. 2), and are fed to the inputs of an exclusive OR-gate 14. When either, but not both of the inputs to the exclusive OR-gate 14 is high, the output of the OR-gate 14 goes high generating a signal pulse D. As illustrated in FIG. 2, the OR-gate 14 provides a pulse D for each transition of the incoming diphase signal. The width of the output pulse from the OR-gate 14 is three system clock cycles (F signals) wide which is the propagation time from $Q_0$ to $Q_3$ of the 4-bit shift register 10.

In accordance with established signal formatting, the information recorded on the card magnetic stripe is preceded by an initial sequence of three mark signals. A second four stage shift register 16 is utilized to recognize this initial sequence. The input of the shift register 16 is strapped high and the clock port receives signal D from the output of the exclusive OR-gate 14. Thus, in response to each pulse from the OR-gate 14, the high level at the input of the shift register 16 propagates one stage until after four diphase input transitions, corresponding to three marking signals, all outputs of the shift register 16 will go high and will remain high until the shift register 16 is cleared upon completion of the decoding process. The $Q_3$ output of the shift register 16 designated MSR (Magnetic stripe reader active), is fed to a logic array 20. In response to the MSR signal going high at the input $I_5$ of the logic array 20, the decoding of the output D from the OR-gate 14 is initiated as will subsequently be more fully appreciated.

The output D from the exclusive OR-gate 14 is also fed to the D input of a type D flip-flop 22 which is clocked by an output $O_3$ strobe signal from the logic array 20. The output of the flip-flop 22 is held low by a low MSR signal from the 4-bit shift register 16 which is applied to the active low direct clear input (DCLR) of flip-flop 22. Thus, since $Q_3$ of the shift register 16 is held low, the output Q, of the flip-flop 22 is held low until four input transitions of the preamble of the incoming diphase signal are received. Thereafter, the logic array 20 is enabled by the high MSR signal and the resulting "strobe" signal causes the output Q of the flip-flop 22 to follow and hold its D input. The output of the flip-flop 22 is a non-return to zero or mark-space data signal K which corresponds to the data information of the incoming diphase signal E.

Counters

The circuit of FIG. 1 measures the time interval between successive clock transitions of the incoming diphase signal E in the terms of system clock pulses F. When a diphase signal transition occurs in a time period which is less than three-fourths of the time interval between the two preceding clock transitions, the base bit interval is decoded as a space. Correspondingly, if no transition occurs during this period, the base bit interval is decoded as a mark. As will be more fully appreciated, a count representative of the time interval mentioned is stored in the A counter 24. Specified levels of the A counter 24 are loaded into the B counter 26 and C counter 28. The counters 26 and 28 serve to define time periods which are approximately three-fourths of the time intervals represented by the counts of the A counter 24. More particularly, the A counter 24 has twelve outputs $Q_0$ through $Q_{11}$. The counter twelve $Q_{11}$ output signal MSB (the most significant bit of the counter) is an overflow signal, which is fed to the input $I_4$ of the logic array 20 and to the clear input of the 4-bit shift register 16. The $O_2$ output, AEN, of the logic array 20 is fed to the enable input EN of the A counter 24 and the $O_4$ output, ACLR, of the logic array 20 is connected to the clear input CLR of the A counter 24. Counter levels $Q_1$ to $Q_{10}$ of the A counter 24 are loaded into the ten-bit B counter 26 which is a down-counter and count levels $Q_2$ to $Q_{10}$ are loaded into the nine-bit C counter 28 which is also a down-counter. It should be noted that after loading, the B counter 26 has one-half the binary value of the A counter 24 whereas the C counter 28 has one-fourth the binary value of the A counter 24. The B and C counters 26 and 28 are chained together. The time period required to count down the chained B and C counters 26 and 28 is three-fourths of the time required to reach the corresponding count in the A counter 24. The A counter as well as the B and C counters 26, 28 are stepped by the common system clock signal F (FIG. 2).

The enable input EN of the C counter is driven by the output of an AND-gate 30. One input of the gate 30 is driven by an output $O_5$ of the logic array designated as signal BC. The signal BC also drives the input of an inverter 32. An active low input of the AND-gate 30 is the borrow output of the C counter 28 which is also connected to one input of a second AND-gate 34 of the output of which drives the enable input EN of the B counter 26. The output of the inverter 32 drives both of the parallel load inputs (PL) of the B and C counters 26, 28. The borrow output signal UNF (underflow) of the B counter 26 is connected to an active low input of the AND-gate 34 and to an input $I_3$ of the logic array 20. When the $O_5$ output BC, of the logic array 20 goes low, the output of AND-gate 30 brings the enable input of the C counter 28 low thus preventing further change of the C counter 28. The low BC signal is inverted by the inverter 32 and the B and C counters 26 and 28 are loaded with the specified levels of the A counter 24. When the output $O_5$ of the logic array goes high, the output of the AND-gate 30 also goes high and this enables the C counter 28. As previously mentioned, the C counter 28 counts down for a time duration which is one-fourth of the time duration represented by the A counter 24 at the time the B anc C counters were loaded. Upon countdown, the borrow output BR of the C counter 28 goes high and this disables the C counter 28 by bringing the active low input of the AND-gate 30 high. The high signal from the borrow output BR of the C counter 28 enables gate 34 and this enables the B counter 26. Thereafter, the B Counter 26 counts down for a time duration which is one-half of the time duration represented by the A counter 24 at the time the B and C counters were loaded.

As will be more fully considered in the following section, the logic array 20 is addressed by the outputs $Q_0$, $Q_1$ and $Q_2$ of a three bit state counter 40. The outputs respectively address inputs $I_0$, $I_1$ and $I_2$ of the logic array. Additionally, outputs $O_0$ and $O_1$ of the logic array 20 respectively control the enable EN and clear CLR inputs of the state counter 40.

Logic Array

In FIG. 1, the state counter 40 is advanced through the states "0" through "7" in step with the system clock signals F which are illustrated in FIG. 2. The logic array 20 of FIG. 1 serves to interpret system status condition signals and the present state of the state counter 40 to generate appropriate control signals including signals for enabling and clearing the various counters e.g., the A counter 24, the C counter 28 and the state counter 40.

Figure 3:
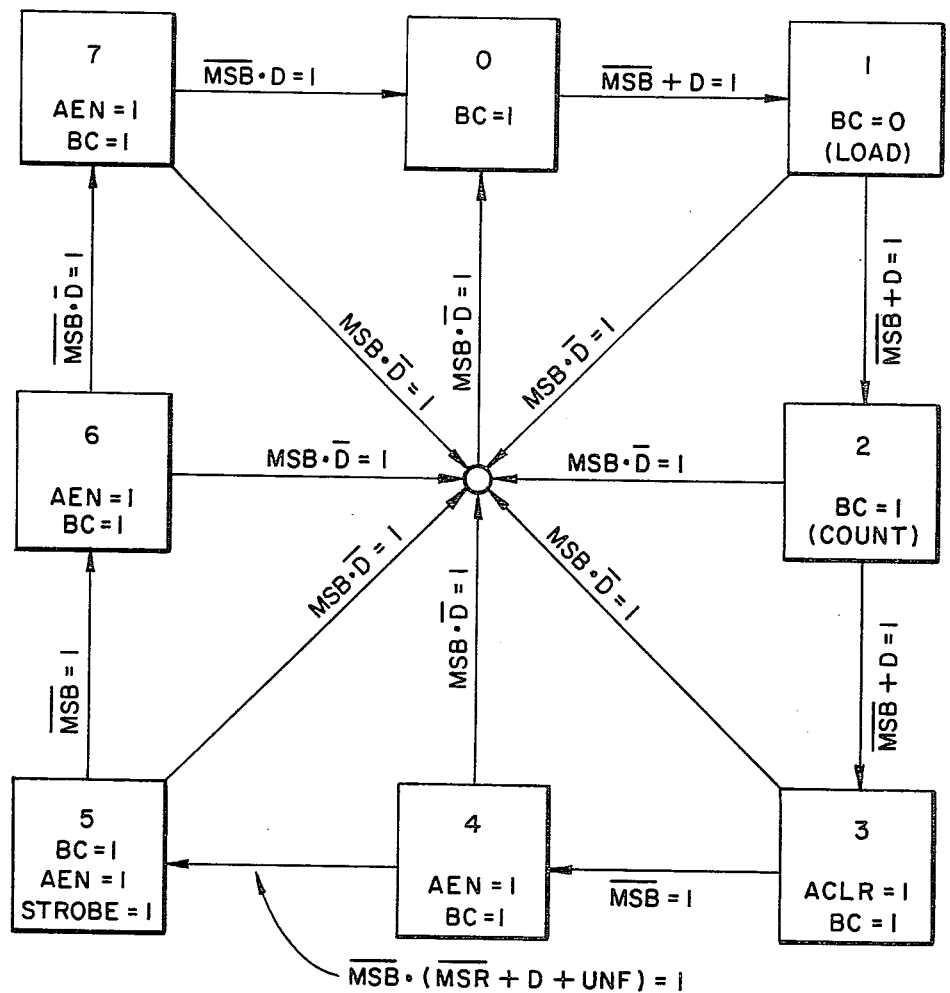
FIG. 3 is a state diagram illustrating the operation of the circuit of FIG. 1.

The logic array 20 may be implemented in various ways as will be apparent to those skilled in the art after consideration of the state diagram illustrated in FIG. 3. In FIG. 3, the active high conditions for the logic array output signals AEN, ACLR, STROBE and BC are shown for each state. To retain clarity, the inactive signal levels are not illustrated with the exception of the inactive low BC signal which, as previously mentioned, corresponds to the loading of the B and C counters 26 and 28 with defined levels of the A counter 24. The various conditions required to advance the state counter 40 from one state to the next are also illustrated in Boolean notation in FIG. 3.

Operation

The stable or inactive state of the state counter 40 is state "0". The ciruit of FIG. 1 will come to rest in state "0" shortly after power is first applied to the circuit and upon the completion of each decoding operation thereafter. The state counter 40 is held in the "0" state when the A counter 24 has reached its maximum count as represented by a binary "1" signal at the $Q_{11}$ output terminal thereof. This output signal of the A counter is termed the MSB signal and is applied at terminal $I_4$ of the logic array 20. So long as the $I_4$ input terminal receives a binary "1" and the $I_6$ input terminal of the logic array 20 receives a binary "0", the state counter 40 will be held in the "0" state by a signal on terminal $O_0$ of the array 20.

When power is first applied to the circuit of FIG. 1, the state counter 40 may be initially in any one of its eight possible states. If the state counter 40 is initially at states 1, 2 or 3, and if the A counter 24 has not reached its maximum count so as to generate a binary "1" signal on the MSB conductor, the state counter will advance to state 4 under control of the system clock signals F. Once the state counter 40 has reached state 4 and if the A counter has not reached its maximum count, the counter 40 will remain in state 4 until such time as one of the necessary conditions specified in FIG. 3 occurs. As seen in FIG. 3, the state counter 40 will advance from state 4 to state 5 under the condition that the A counter 24 has not reached its maximum count and at least one of the conditions specified in the parenthetical expression occurs. Upon the occurrence of one of the three conditions; namely, $\overline{MSR}$="1", D="1" or UN-F="1", the state counter 40 will advance to state 5 upon the occurence of the next succeeding clock pulse F. After the state counter 40 has reached state 5, it will advance through states 6 and 7 to state 0 or will advance from state 5 or 6 to 0. As seen in FIG. 3, the state counter 40 will advance from state 5 to 6 so long as the A counter 24 has not reached its maximum count and will advance from state 6 to 7 so long as the A counter 24 has not reached its maximum count and there is no output on the D conductor at the output of the exclusive OR-gate 14.

The state counter 40 will advance from state 7 to 0 and will hold in state 0 when the A counter 24 reaches it maximum count and there is no signal present at the output of the exclusive OR-gate 14. This latter condition occurs immediately after power has first been applied to the circuit arrangement of FIG. 1 and also upon completion of each stripe reading operation. During the time that data is being received (as evidenced by pulses occurring at the output of the gate 14), the state counter 40 will advance from state 7 to state 0 under the condition that the A counter 24 has not reached its maximum count. Under this condition, the state counter will immediately advance to state 1 upon the occurrence of the next succeeding clock pulse and the interpretation of the input signal will proceed.

When the circuit is in state "0", the A counter 24 is held inactive (AEN=0) and the B and C counters 26, 28 downcount in sequence awaiting the first incoming diphase signal transition represented by a pulse signal level D. In response to a level D pulse at the output of the OR-gate 14, the state counter advances ($\overline{MSB}+D=1$) to state 1 and the B and C counters 26, 28 load with specified levels of the A counter 24. As mentioned, the signal pulse D is three clock cycles wide (FIG. 2) and the state counter 40 advances to state "2" whereat the B and C counters 26 and 28, in sequence, start to count down. The state counter 40 further advances to state "3" whereat the A counter 24 is cleared (ACLR=1) and the state counter 40 advances to state "4". During the initialization procedure, which as mentioned starts at the first incoming diphase transition, signal level D goes low initially as the circuit advances between states "3" and "4". Thereafter, signal level D will go low during the transition between states "2" and "3".

In state "4", the A, B, and C counters 24, 26 and 28 are all enabled with A counter 24 counting up and B and C counter 26, 28 counting down. Transfer to state "5" occurs if the overflow output of A counter 24 remains low ($\overline{MSB}=1$) and one of the conductors $\overline{MSR}$, D or UNF goes high $\overline{MSB} \cdot (\overline{MSR}+D+UNF)=1$. As previously mentioned, initialization occurs during the first four incoming diphase transitions which corresponds to the four D signal clock inputs required to fill the shift register 16. During state "5", a strobe pulse is generated by the logic unit 20 at the output $O_3$ thereof. However, to assure a low data output signal (a mark signal) from flip-flop 22 during the initialization process, the strobe is ineffective since the MSR signal from the four-bit initialization shift register 16 is fed to an active low, direct clear input of the flip-flop 22 forcing the output low. Following state "5", the state counter 40 advances to state "6" and then if D=0 on to state "7" and waits in state "7" until a D pulse occurs ($\overline{MSB} \cdot D=1$). In reponse to the diphase transition pulse D, the state counter 40 advances through state "0" to state "1" whereat the B and C counters 26 and 28 will again load with three-fourths of the A counter 24. Thereafter, the state counter 40 advances the logic array 20 through states "2" and "3" to state "4". Since output of the four-bit shift register 16 is still low, i.e. MSR=0, the state counter 40 will advance through "5" and "6" to state "7" whereat the logic array 20 input $I_6$ awaits the next data transition pulse D. The process repeats itself four times, that is, until MSR=1 bringing the direct input to the flip-flop 22 high. The state counter awaits the next diphase signal transition pulse which starts actual decoding of the mark-space data of the incoming diphase signal. In response to a pulse, D, the logic array 20 output O, goes high releasing the state counter 40 which advances the array to state "1". In state "1" the B and C counters 26 and 28 are loaded with three-fourths of the count of the A counter which is related to the time interval between the two immediately preceding diphase signal transitions. When state "3" is reached, the A counter 24 is cleared. Thus, when the circuit arrives at state "4", the B and C counters 26 and 28 are counting down from a count level representing three-fourths of the interval between the two immediately preceding diphase clock transitions. Since MSR will remain high throughout the remainder of the decoding process, advancement from state "3" to state "5" occurs in response to either a complete countdown of the B and C counters indicating an incoming diphase mark base bit interval i.e. underflow UNF=1, or the occurrence of a mid-bit space transition D=1 of the incoming diphase signal. In response to a mid-bit transition pulse, the high level of the D signal is latched into the flip-flop 22 during state "5". Alternatively, in the event UNF=1, a low signal representative of a mark will be latched into the flip-flop during state "5". Thus, a diphase transition pulse occurring during the countdown of the B and C counters will result in a high being loaded into the flip-flop 22 and should the counters B and C underflow, a low signal is loaded into the flip-flop 22. The B and C counters 26 and 28 establish a window which is equal to approximately three-fourths the time interval between the two immediately preceding diphase clocking transitions. When a transition occurs during this window, the transition is interpreted as a space.

The A counter continues to count in state "7" until a diphase clock transition occurs ($\overline{MSB} \cdot D=1$). In response to the next D pulse, the B and C counters 26 and 28 are loaded with the new count of counter A and the cycle repeats. It will be appreciated that the count of the A counter corresponds to the time interval between successive diphase clocking transitions. Since the timing interval as represented by the count in the A counter is constantly updated, that is, established for each base bit interval, the circuit continually adjusts to varying input speeds.

Although the invention has been particularly shown and described with reference to a preferred embodiment thereof, it will be understood that various changes in form and detail may be made without departing from the scope and spirit of the invention as defined by the following claims:

What is claimed is:

1. Apparatus for decoding diphase input signals E having base bit intervals delineated by spaced diphase clocking signals and first and second data information occurring between the clocking signals, said clocking signals having a relatively wide input speed range comprising:

means (24) for measuring the time durations of said base bit intervals, means for defining time periods which correspond to and are immediately subsequent to the measured time intervals, each time period being of less duration than the corresponding time interval, means (22) for sensing said data information of said input signal during said time periods and for generating corresponding output signals, control means (20,40) for controlling said measuring means, said defining means and said sensing means, said control means comprises a combinational logic array (20), and a state counter (40) connected to said logic array for defining a plurality of operating states of said array.

2. A circuit arrangement for generating binary output signals corresponding to information comprising selected sets of first and second diphase data signals which are preceded immediately in time by a preamble consisting of a plurality of said first diphase data signals in sequence, the time interval of each of said diphase data signals defined by first and second successive clock transitions, said first diphase data signals characterized by the absence of further signal transitions between said interval defining clock transitions, and said second diphase data signals characterized by the occurrence of a data signal transition between said interval defining clock transitions comprising:

a system clock signal source for generating system clock signals having a repetition rate substantially in excess of the repetition rate of said diphase signal clock transitions;

means responsive to said diphase data and preamble signals and to said system clock signals for generating first output signals corresponding to the signal transitions in said diphase signal;

a first counter for counting said system clock signals when enabled and for generating interval and overflow signals;

a control circuit arrangement comprising;

a state counter responsive to said system clock signals and to enable and clear signals for generating a plurality of state signals, and a logic circuit responsive to said state signals, said transition signals and to status signals for enabling and clearing said first counter, for enabling and clearing said state counter, and for generating further system control signals;

an output flip-flop comprising data in, clock, and enable input terminals for generating said binary output signals;

means for connecting said first output signals to said data input terminal;

means responsive to a certain pattern of said transition signals for generating a "preamble detected" status signal in response to the receipt of said diphase signal preamble;

means for electrically transmitting said "preamble detected" signals to a status input terminal of said logic array and to said enable input terminal of said output flip-flop;

a second counter responsive to said interval signals and to one of said further system control signals for defining a subsequent period of time in terms of the system clock rate, said subsequent period of time being greater than half but less than the entire interval between the two immediately preceding diphase clock signals, said second counter being responsive to said sytem clock signals for decrementing the count therein and arranged to generate an end-of-period signal;

said logic circuit comprising means responsive to one of said state signals, said overflow signal, said end-of-period signal and said first output signals for selectively generating a data strobe signal to said clock terminal of said output flip-flop and said output flip-flop comprises means responsive to said strobe signals and said first output signals for generating said binary output signals.

* * * * *